United States Patent Office 2,993,851
Patented July 25, 1961

2,993,851
HIGH TEMPERATURE AND NEUTRON PRODUCING SYSTEM
George Paget Thomson, Cambridge, and Moses Blackman, London, England, assignors, by mesne assignments, to the United States of America as represented by the United States Atomic Energy Commission
Filed Jan. 14, 1953, Ser. No. 331,154
4 Claims. (Cl. 204—193.2)

This invention relates to means for attaining extremely high temperatures and to neutron-producing systems involving such temperatures.

For the initiation of nuclear reactions in light elements, particularly for the production of neutrons, effort has hitherto been primarily directed to bombarding targets of or containing deuterium compounds or light elements with protons, deuterons or helium nuclei as constituents of an ionised gas and accelerated to a sufficient degree to attain conditions for the nuclear reaction. In the specification of our copending patent application Serial No. 744,510, filed April 28, 1947, for "High Temperature Systems" (now abandoned) there is disclosed a means for accelerating nuclei in such a way that they interact between themselves to a significant degree whereby their energy is not lost in bombardment of a relatively massive target, nor is released nuclear energy lost in the target; on the contrary energy released by nuclear reaction becomes available in the body of high speed nuclei to maintain their speed and to compensate for losses by radiation.

The major requirements which arise and which are set forth in said specification are, firstly, to accelerate the nuclei in such a way that they have an irregular distribution of velocity so that frequent collisions occur, in other words energy should be imparted to them in a way to increase the temperature of the gas and not merely to accelerate the nuclei in parallel paths to constitute a beam of fast ions. To meet this requirement it is proposed to accelerate the nuclei of a body of ionised gas partly by the bombardment of electrons derived from the act of ionisation and afterwards themselves accelerated by applied electromagnetic fields, and partly by the action of space charges set up as a consequence of the acceleration of these electrons in a manner described below.

Another requirement which arises is that of containing the nuclei in an accelerating field for a substantial time without allowing them to bombard substance of a larger order of density. Attainment of this objective involves providing for the localising of gas particles without interposing material barriers in the path of the gas particles. In general a gas, by reason of the thermal motion of its particles, tends to bombard its containing walls; such walls in fact are or tend to be material barriers in the path of the gas particles. Hence means other than material containing walls are required for exerting a localising effect upon the gas.

It is proposed in said copending specification to establish, within an ionized gas of low density and high particle energy and by means of magnetic or electric fields, a pressure gradient falling in all radial directions from a central point or in all directions normal to a circular or other endless axis within the gas so that the gas is largely contained by the field and its bombarding effect upon material containing walls is substantially-reduced.

In one way of carrying out that proposal, provision is made for maintaining the electrons of an ionised gas at high speed in an endless path to set up a field tending to contain the gas.

The circulating high-speed electrons constitute a closed loop of current of large amperage. An electron attaining as the result of a collision a radial component of velocity with respect to the main electron stream is deflected by the lines of force encircling the stream to follow a trochoidal path in the general direction of the main stream.

The positive ions or nuclei of the gas are bound to the electron stream by electrostatic attraction. Outward movement from the bound electron leaves a space-charge the effect of which is to limit such movement.

Since the nuclei are thus largely contained by the magnetic and electric field of the ring current and suffer only a minor loss of energy by bombardment of physical containing walls, their energy can be continuously increased over a substantial period of time by bombardment by the circulating high speed electrons and also by the action of the space-charge mentioned above. The effect of the latter is as follows: the region of the current loop acquires a negative charge as a result of the mutual attraction of the different current elements which are composed of moving electrons of negative charge. This negative charge attracts the positive nuclei of ionised gas outside the region of the current loop. These nuclei are therefore accelerated inwards towards the region of the current loop in which region their paths cross, giving them the desired random motion and leading to collisions and so to the production of nuclear reactions and neutrons. While the device is being started the energy of these nuclei is all derived directly or indirectly from the external source or sources of power which create and maintain the current loop, but when the collisions are violent enough to produce nuclear reactions the motion of separation of the positively charged particles of disintegration which are formed simultaneously with the neutrons automatically results in the maintenance of a negative charge in the region of the current loop in spite of the continued inward motion of the positive nuclei. In this way the energy of disintegration serves to establish the energy of random motion of the nuclei and so produce more disintegrations. This diminishes the energy taken from the current loop and also the drain on the external source of power which, however, is still required to operate at a lower rate.

The device of the present invention comprises a vessel defining a cavity, means for establishing and maintaining a continuous motion of electrons in an endless path within said cavity, entry means in said vessel for the entry of gas and means for withdrawing gas from said vessel. The means for withdrawing gas may comprise exhaust ports extending over a major part of the cavity-defining surface of said vessel.

In a preferred embodiment of the invention the vessel is in the form of a hollow torus made up a plurality of electrically conducting sectors insulated from each other and the electrons are maintained in continuous motion by applying potentials to the sectors in ordered sequence at high frequency so as to set up a travelling electric wave in the vessel.

The electrons may be accelerated in the first instant by the electromagnetic action of a rapidly magnetised or demagnetised iron core threading the torus much as in the well-known betatron device. The present device is, however, less exacting than a normal betatron, since it is found that, in the presence of gas, currents excited in this way flow round a torus without a magnetic field to guide them. It is therefore unnecessary to satisfy what is commonly known as the betatron condition connecting the total change of magnetic flux through the torus with the field in the region of the current. Consequently the change of flux can be produced wholly or mainly by demagnetizing the iron core, with the advantage that the magnetising current after initiation either need not be maintained at all or can be maintained at reduced strength if some slight magnetic control of the current is found desirable in special circumstances.

It is not necessary in a gas-containing betatron of the size envisaged by the invention to use an artificial source of ionisation to start the discharge. The ions naturally present in the gas, as the result of cosmic rays and of radioactive impurities in the material of the vessel, are sufficient to initiate the discharge.

In addition to the electron accelerating effect of the high frequency wave, there is a substantial heating effect on the gas as a whole; since the gas is ionised, a large part of the energy of the wave is imparted to it and appears as kinetic energy of the nuclei of the gas. In this way energies of the order of 100,000 electron volts needed for nuclear interaction may be imparted to the nuclei corresponding to gas temperatures of several hundred million degrees centigrade and when this condition is attained, the energy level is increased and maintained at a higher value by the energy of the nuclear reaction.

Provision may be made for continuously or intermittently withdrawing heat-treated gas and for introducing fresh amounts of gas to be treated. Replenishment may be effected by allowing fresh molecules of gas to enter through apertures in the wall; the low-energy molecules on ionisation are drawn in toward the axis by the space charge effect. If the gas is deuterium a second ionisation ensues producing two deuterium nuclei and an electron well inside the toroid. Thus electrons, which in the free state would not pass through the strong magnetic field, are passed through as part of the molecular ions.

The gas withdrawn through apertures in the wall is enriched in products of disintegration because these being produced with energy much greater than that of the parent deuterium nuclei are enable more readily to overcome the radial electric field inside the torus.

The invention is primarily concerned with raising the temperature of a gas of low density to such a level that nuclear disintegation occurs with release of energy tending to maintain the temperature. In such case, means may be provided to convey heat away in an external coolant available thereafter as a working fluid for heating purposes or for power generation or for other energy utilisation purpose. The disintegration in some cases involves the production of neutrons and the system may then be employed as a neutron source for the irradiation of materials containing uranium or thorium or other neutron absorbing element for the enrichment of fissionable constituents.

The invention does however also provide a means of attaining very high temperatures which is of general application.

The theory of the invention and our particular embodiment thereof will now be described with reference to the accompanying drawings wherein.

Theory

Figure 1:
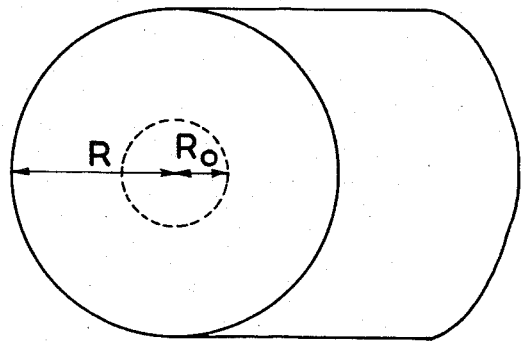
FIGS. 1 and 2 are diagrams of a form in cross section.
Figure 2:
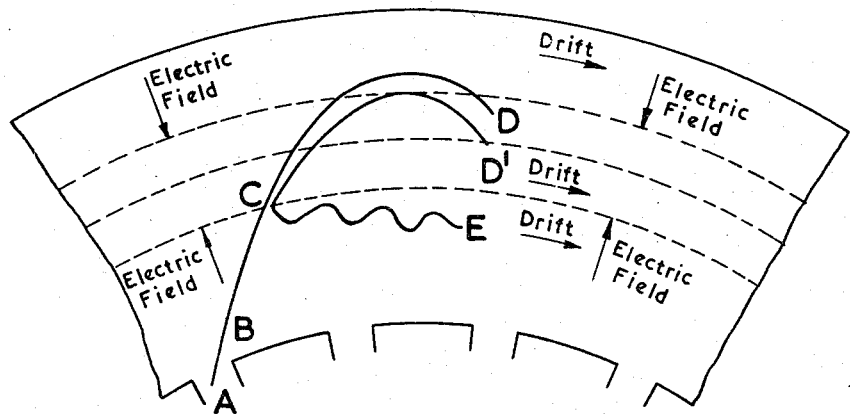

Referring to FIG. 1.

Let $v_d$ be the R.M.S. velocity of the deuterons $v_d^1$ be the drift velocity of the deuterons around the torus $v_e$ be the R.M.S. velocity of the electrons $v_e^1$ be the drift velocity of the electrons around the torus.

Let R be the radius of the cross-section of the torus. Let $r_0$ be the radius of the central region in which we shall assume the current is established. It will be assumed constant over this region. Let $n$ be the number of electrons or deuterons per cc., assumed constant over the cross-section of this region.

The current $$I = n\frac{e}{c}(v_e^1 - v_d^1) \cdot \pi r_0^2$$

$e$ is E.S.U., $I$ is E.M.U., $c$ is the velocity of light.

The field H at the radius $r > r_0$ is $$H = 2\frac{ne}{c}(v_e^1 - v_d^1)\frac{\pi r_0^2}{r} \text{ in gauss}$$

If V is the potential difference in E.S.U. between $r_0$ and R, and if we neglect the space charge in this region, the electric field at a radius $r$ is $$\frac{V}{r \log R/r_0}$$

For convenience we shall take $\log R/r_0 = 1$

Hence $$\frac{eV}{r} = v_e^1 \cdot \frac{e}{c} \cdot H \text{ or } V = 2\pi \frac{ne}{c^2} \cdot v_e^1(v_e^1 - v_d^1)r_0^2 \quad (1)$$

Now $v_d^1$ arises from the way in which the gas is let in. This is done at the walls. The gas molecules are moving with thermal velocities, and, as will be shown later on, the first ionisation of the molecule occurs near the wall. Once ionised the molecules are drawn in by the electrostatic field and because of their increased speed will go much further before they again undergo an ionising or dissociating collision, a distance in fact comparable with R. While the molecule is singly ionised, the nuclei in it only get half the acceleration they would have if free, and the mean energy they will acquire will not much exceed $eV/2$. This energy is of course large compared with the equipartition energy $3/2 \, kT$, to which they will in time be reduced by collisions. While it is being accelerated inward the single charged molecule will be acted on by the magnetic field and deviated in the direction of motion of the electrons, creating the drift we have called $v_d^1$.

Current-velocity relations

Consider a particle let in with net charge $e$. Treat the torus as an infinitely long solenoid. Axial force = $He\dot{r}/c$. Therefore net momentum given to particle along axis is $$\int \frac{He\dot{r}}{c}dt = \int \frac{He}{c}dr \quad (2)$$

Thus if the charge returns to wall (even if the charge has been transferred) there is no change in momentum due to the magnetic field.

If masses $m$, charges $e$, leave the walls with zero axial velocity and return as $m^1$ with velocity $Z^1$, $$\Sigma m^1 z^1 = 0 \text{ also } \Sigma m^1 = \Sigma m$$

This does not necessarily mean $\Sigma \frac{1}{2} m^1 z^{1^2} = 0$ but it does mean that the mass velocity of the gas at the walls is zero. However, the above ignores the accelerating force parallel to the axis which will have to be supplied from outside to keep the current going and which will give a drift.

If we suppose the impressed force to stop and allow the current to decay, the electrons will all in time come to the walls. Their momentum will be more than we have supposed because $v_e^1 > v_d^1$ but electron momentum is so small anyhow that this hardly matters.

To find electronic drift:

$$H = \frac{e}{c}(v_e^1 - v_d^1) n 2\pi \frac{r_0^2}{r}$$

the current being assumed confined to $r_0$ $$M^1 v_d^1 = \int_R^{r_0} \frac{He}{c} dr = \frac{e^2}{c^2}(v_e^1 - v_d^1) n 2\pi r_0^2 \log R/r_0 \quad (3)$$

$M^1$ is a sort of mean mass between the mass of a deuteron $(3.3 \times 10^{-24})$ and twice this value, due to the charged particles being part of the time an atom and part a molecule.

$$V = \frac{e}{c^2} \cdot v_e^1(v_e^1 - v_d^1) n \cdot 2\pi r_0^2 \log R/r_0 \quad (1)$$

Hence $$M^1 v_d^1 v_e^1 = eV \quad (4)$$

and $$\frac{v_d^1}{v_e^1} = \frac{e^2/c^2 \cdot 2n\pi r_0^2 \log R/r_0}{M^1 + e^2/c^2 \cdot 2n\pi r_0^2 \log R/r_0} = f \quad (5)$$

$M^1 \sim 7 \times 10^{-24}$ $$\frac{e^2}{c^2} \cdot 2n\pi r_0^2 \log R/r_0 \sim 1.7 \times 10^{-39} n r_0^2$$

Take $r_0^2 \sim 10^2$ cm.$^2$ the numerator is $1.7 \times 10^{-37} n$, $n$ varies from $10^{13}$ to $10^{15}$ about, so $$\frac{v_d^1}{v_e^1}$$

varies from .2 to .96
Thus $M^1 f v_e^{1\,2} = eV$ and $$v_e^1 = \sqrt{\frac{eV}{fM^1}}$$

$$Hr = \frac{Vc}{v_e^1 \log R/r_0} = c\sqrt{\frac{fM^1 v}{e}} = 4.8 \times 10^3 \sqrt{fV} \quad (6)$$

wherein $f$ is a factor related to the Debye screening distance.
With $f \sim .9$ and $V \sim 3000$ E.S.U.

$$H \text{ at } r_0 \sim 2.5 \times 10^4 \text{ gauss} = \frac{2I}{10}$$

$I =$ total current $\sim 10^6$ amps.

$$v_e^1 \sim v_d^1 \sim 5 \times 10^8 \text{ cm./sec.}$$

As a check on this value of $v_d^1$ we can estimate it in another way.
Let the incoming nucleus fall through the potential $aV$ as part of a molecule, $(1-a)V$ as a bare nucleus wherein $a$ is the average charge of the particle. Its energy will be $$\left(1 - \frac{a}{2}\right) eV$$

Hence $$(1-a/2) eV = \frac{M}{2} \bar{v}_d^2$$

where $\bar{v}_d$ is the total velocity of the nucleus when it reaches the centre.
For hydrogen $0 < a < 1$.
Comparing this with $feV = M^1 v_d^{1\,2}$ we see that $\bar{v}_d$ comes out larger than $v_d^1$, which it ought to, and is of the same order of magnitude. If $v_d^1$ came out larger than $\bar{v}_d$ it would mean that the nuclei could not penetrate to $r_0$. The factor $\log R/r_0$ would have to be reduced.
We have treated $v_d$, $v_d^1$ as constant over the centre core. Outside this $v_d^1$ would in general be a function of $r$, diminishing as one nears the wall, because of the action of the magnetic field.
There will be a permanent circulation of nuclei corresponding to $v_d^1$ around the torus, $v_d^1$ diminishing with $r$.

If a nucleus near the centre gets neutralised it will cease to be influenced by the field and will go off in a straight line with a velocity which will be compounded of $v_d^1$ and a random motion. If it hits the wall directly it will give up energy partly composed of $v_d^1$. If however, as is more probable, there is charge exchange on the way out, the effective value of $v_d^1$ is reduced, since the drift varies with $r$ and, vanishes at the wall, for particles that have kept their charge.

As a result of collisions $\bar{v}_d$ will usually decrease, and the velocity distribution of the nuclei will tend to a Maxwellian distribution with $$kT \sim \frac{eV}{20}$$

superposed on a drift $v_d^1$ which is a decreasing function of $r$ vanishing at the walls.
The exact short term equilibrium conditions are fixed as follows:
If $n$, $n^1$ are the densities of electrons and nuclei, then $$\bar{\nabla}^2 V = 4\pi(n - n^1)e$$

taking $V = 0$ at centre $$n^1 = A \exp(-eV/kT)$$

where $A$ is chosen so as to make the total number of particles right $$rH = \int_0^r \frac{i \cdot 2\pi \rho}{4\pi} d\rho$$

where $i = en(v_e^1 - v_d^1)$ since $n \approx n^1$ $$H \frac{v_e^1}{c} = \frac{\partial V}{\partial r}; \quad M^1 v_d^1 = \int_R^{r_0} \frac{H_e}{c} dr$$

Unknown are $i$, $n$, $n^1$, $V$, $H$, $v_e^1$, $v_d^1$, $T$ all functions of $r$ except the last. There are 6 equations to determine them. A 7th equation is provided by the consideration that in the "short time" considered the loss of positives to the wall is negligible. This gives $cV_R \sim 20kT$ as we have seen. The last equation needed is provided by considering the conservation of the electrons, the outward flow due to collisions balancing the input.
The longer term conditions must allow for (a) Replacement of electrons which drift into the walls
(b) Replacement of deuterons which disintegrate or strike the walls
(c) Removal of products of disintegration.

Apart from (a) the current is self-supporting.
Suppose an electron strikes a positive from behind and has its velocity reversed. It will be carried downstream by the electric field and its forward velocity restored to that appropriate to its new position. Imagine a succession of electrons doing this, and the net effect is to transfer an electron from the centre to the wall. During the impulse there is a forward impulse on the other electrons proportional to $\Delta v$ but this is reversed as the electron is accelerated again, the net effect being positive due to the last electron which hits the wall before its re-acceleration is complete. Calculation shows that this effect is of order $$\frac{I}{T_e}$$

where $T_e$ is the mean life of an electron in the torus. The energy for it comes from the electrostatic field.
Each electron that goes from the centre to the walls gains energy $W = eV$. This energy appears first as random kinetic energy $\frac{1}{2}mv_e^2$ where $v_e$ the total velocity is large compared with $v_e^1$ the drift velocity which alone is effective in producing the current. Some of this energy will be given out in radiation, but for the condition we have considered, where $W \sim 1$ mev. it is probably more than is required for that purpose (see below). Some of the rest will be given to the walls, some exchanged with the deuterons. It constitutes one of the most important losses. The energy required to keep up the current is easily calculated. If $T_e$ is the life time of an electron, the loss in current per sec.

$$\Delta I = \frac{I}{T_e}$$

The energy of the magnetic field is $E_M = \tfrac{1}{2} L I^2$ $$\therefore \Delta E_M = L I, \quad \Delta I = \frac{L I^2}{T_e} = \frac{2 E_M}{T_e}$$

wherein L is the coefficient of self-induction of the current I or $$\frac{\Delta E_M}{E_M} = \frac{2}{T_e}$$

This energy must be supplied from a device which will accelerate the electrons in the desired direction. It should be noticed that the quite considerable kinetic energy of drift of the positives, $\tfrac{1}{2} n M v_d^{12}$ is derived from the electrostatic energy of the system. This latter is replaced by the direct action of the nuclear disintegration which shoots positively charged particles, against the potential difference, from the centre to the walls.

When deuterium is employed as the gas being heated, neutron-producing and other nuclear reactions occur as follows:

$$\begin{cases} H^2 + H^2 \rightarrow H_e^3 + n + 3.36 \text{ mev.} \\ H_e^3 + H^2 \rightarrow H_e^4 + H^1 + 18 \end{cases}$$
$$H^2 + H^2 \rightarrow H^3 + H^1 + 3.97$$
$$H^3 + H^2 \rightarrow H_e^4 + n + 17$$

$\sigma = 4.6 \times 10^{-26}$ at 200 kv.
$\sigma$ uncertain
$\sigma = 3.6 \times 10^{-26}$ at 200 kv.
$\sigma$ large In each case $3H^2 \rightarrow H_e^4 + n + H^1 + 22$ mev.

The above cross sections $\sigma$ were determined with the target nucleus at rest, as it is in a laboratory experiment. If the nuclei are moving with equal and opposite velocities, the same energy of impact is achieved if each has an energy of 50 kv. since each will now have half the velocity and so quarter the energy. It can be shown that if the nuclei have random velocities their mean energy must be raised to 75 kv. to give the same energy of impact. 75 kv. is the figure used in the design of the embodiment described.

There will be a considerable accumulation of $H_e^4$ if we have to work at 1 mev., but if the full Maxwellian tail is not developed in the velocity distribution of the nuclei it may be possible to work at less.

We can assume the concentration of $H^3$ and $H_e^3$ negligibly small since it reacts so quickly, i.e., the second reaction to take place instantaneously. Below we will see how far the accumulation of these products will modify the conclusion.

*Life time of the electrons in the torus*

Calculation, based on a careful averaging of individual collisions shows that the rate of expulsion of an electron due to collisions is given by the expression $$\frac{dr}{dt} = \frac{4\pi n c^2 e^3 X}{m \cdot H^2} \left[ \frac{\Lambda^2}{\mu^{5/2}} + \frac{c^2 \cdot X^2}{H^2} \cdot \frac{\log \alpha \mu}{\mu^{5/2}} \right] \quad (7)$$

Here $\Lambda^2$ is the (velocity)$^2$ corresponding to two degrees of freedom of the electron and $\mu$ is the square of the whole velocity $v_e$; $\alpha$ is defined as $Pm/e^2$, where P is the greatest distance at which the inverse square law can be taken to hold. The limit is that of the spacing of the particles, so that $P \sim n^{-1/3}$. In actual fact, the second term is small compared with the first which will alone be considered.

Thus $$\frac{dr}{dt} = \frac{4\pi n c^2 e^3}{m} \cdot \frac{X}{H^2} \cdot \frac{\Lambda^2}{\mu^{5/2}}$$

$$= \frac{4\pi n c^2 e^3}{m} \cdot \frac{V}{r} \cdot \frac{e r^2}{c^2 \cdot f \cdot M^1 V} \left( \frac{2}{3} \right) \frac{1}{v_e^3} = \frac{8\pi}{3} \cdot \frac{n e^4 r}{m M^1 f} \cdot \frac{1}{v_e^3}$$

The electron we are considering is driven from the edge of the current $r = r_0$ to the wall of the torus $r = R$ by the action of the electric force X which moves it outwards when the balance between the electric and magnetic forces acting on it is disturbed by a collision. The life time of the electron will be taken as the time $T_e$ from $r = r_0$ to $r = R$.

Hence $$T_e = \log R/r_0 \frac{3f}{8\pi} \cdot \frac{m M^1}{n e^4} \cdot v_e^3 = 3.6 \times 10^{17} \times \frac{\beta^3 f}{n \sqrt{1 - \beta^2}} \quad (8)$$

where $v_e = \beta c$ taking as before $\log R/r_0 = 1$ and assuming $M^1$ is twice the mass of a deuteron and wherein $$\beta = \frac{V_e}{c}$$

To give an idea of the order of magnitude we can take $$f \sim 1, \quad \beta \sim \tfrac{1}{2}$$

giving $$T_e \sim \frac{5 \times 10^{16}}{n} \sim 100 \text{ secs.}$$

$T_e$ can also be written

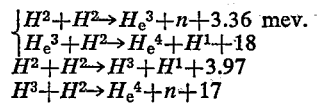

$$= 9 \times 10^3 (1 - f) \frac{\beta^3}{\sqrt{1 - \beta^2}} \approx \frac{10^3 \beta^3}{\sqrt{1 - \beta^2}} \text{ for } n = 3 \times 10^{14} \quad (9)$$

*Exchange of energy between electrons and positives*

The cross-section for a "large" collision between an electron of energy $eP$ and a heavy positive of unit charge at rest is $$\frac{\pi}{4} e^2 / P^2$$

where a "large" collision is one in which the electron is deflected through at least 90°. The mean energy transfer for such collisions is $$\frac{2m}{M} e P$$

Hence the transfer due to these per sec. per electron is $$n \cdot \frac{\pi}{4} \cdot \frac{e^2}{P^2} \cdot v_e \cdot \frac{2m}{M} \cdot e P = \frac{\pi}{2} \cdot \frac{m}{M} \cdot v_e n e^3 / P = \pi \frac{e^4 n}{M v_e}$$

The total transfer is known to be considerably larger than this, by a factor of the order of 40.

Now the time during which the transfer lasts is $$T_e = \frac{3f}{8\pi} \cdot \frac{m M^1}{n e^4} v_e^3$$

and $M^1 \div 2M$ so the total transfer would be $$\sim 40 \, T_e \cdot \frac{\pi e^4 n f}{M v_e} = 30 m v_e^2 \cdot f$$

or 60 times the kinetic energy of the electron (since $f \sim 1$) assuming that the energy of the electron is large compared with that of the deuteron. This however will not be the case. It is true that the electron has a potential energy $eV \sim 20 \, kT$ (see below) or 13 times the kinetic energy of the deuteron. But it has to provide for the radiation loss, $$2.4 \times 10^{-33} \cdot v_e n \text{ ergs/sec.}$$

(Heitler, Quantum Theory of Radiation) which in time $T_e$ amounts to $$2.4 \times 10^{-33} \frac{3f}{8\pi} \cdot \frac{mM^1}{e^4} v_e^4$$

Expressed in terms of P this is $P^2.f.3.6 \times 10^{-11}$. Even if P is taken as 250 E.S.U. or 75 kv., which is what it would come to if there was complete equipartition, this gives an energy of 1.4 mev., or rather more than the 1 mev. available. If the mean energy of the electron were higher than this the loss would be still greater.

While we cannot say for certain whether the mean energy of the electron is rather more or rather less than that of the deuteron, it cannot differ from it very much.

If the electrons can transfer about 60 times their energy to deuterons at rest one would expect them to lose or receive an energy comparable with that of the deuterons, i.e. 75 kv. when the difference between the two mean energies is kept at a value of the order of $\frac{1}{60}$ that of either. The difference between the electrons potential energy and its radiation loss appears to be of the order .4 mev. or 6 times the energy of the deuterons so the mean energy of the electrons should differ from that of the deuterons by $\frac{1}{10}$ of the latter's energy or 7.5 kv. In view of the uncertainty of this quantity, even in sign, it will be best to ignore it and take the mean electron energy as 75 kv. This gives $\beta = .53$ and the life time for $n = 3 \times 10^{14}$ is 175 secs.

Energy content

The torus contains energy in many forms which we may group as ordered and disordered. The former are the electrostatic energy $E_P$, the magnetic energy $E_M$ and the kinetic energy of the drift of the deuterons $E^1_D$; the corresponding drift energy of the electrons is much smaller and may be ignored. The disordered energy is composed of the random energy of the deuterons $E_D$ and that of the electrons $E_E$. There is also the energy of ionisation and that of chemical dissociation, which are relatively small, besides of course the nuclear energy.

The power losses will be: $W_R$ the radiation from the electrons: $W_D$ the transfer of energy to the walls by the collision of deuterons and spent products which have reached thermal equilibrium: $W_E$ energy transferred to the walls by electrons: $W_N$ that due to neutral atoms produced by exchange: $W_Q^1$ the energy given to the walls by the impact of the products of nuclear disintegration: $W_Q$ total energy released.

In order to keep the process going, we have to feed in power = $W_S$ from the electromagnetive wave or the potentials applied to the electrodes, which can replenish the current as it decays by the diffusion to the walls of the electrons forming it and perhaps supply other energy losses.

The orders of magnitude of the different energies for a torus of 2000 litres capacity with $kT \sim 50$ kev., a potential difference of 1 mev. and a density of $3 \times 10^{14}$ electrons/cc. are shown below.

ENERGY IN JOULES

| $E_P$ | $E_M$ | $E_D^1$ | $E_D$ | $E_E$ |
|---|---|---|---|---|
| 3,000 | $3 \times 10^6$ | $2 \times 10^7$ | $10^7$ | $10^7$ |

POWER IN KILOWATTS

| $W_R$ | $W_E$ | $W_D$ | $W_N$ | $W_Q^1$ | $W_Q$ | $W_S$ |
|---|---|---|---|---|---|---|
| 700 | 75 | ~50 (?) | ~50 | 3,500 | 10,000 | >14 |

N.B.: $W_D$ and $W_S$ depend greatly on the exact conditions.

Charge and energy balance

Neglecting the accumulation of $He_3$ and $He_4$, we can work out how much gas must be admitted and how much energy must be supplied from the synchrotron to preserve a steady state in which the various stores of energy described above remain unchanged.

Let us first consider how the energy changes form. A charged molecule admitted at the wall will acquire kinetic energy from the electrostatic energy of the field. After some oscillations backwards and forwards across the section of the torus, by which time it will have been ionised into two deuterons and an electron, most of this kinetic energy will have been dissipated into heat in the gas by collisions with the nuclei. The electron however will have potential energy $eV$. As the electron is forced out in time $T_e$ it will, as we have seen, give up this potential energy, largely as radiation, though a little will be given up when it strikes the wall.

When disintegration occurs, assuming for the moment that all the charges reach the wall, one electronic charge of positive electricity will be raised through the potential V for each deuteron transformed. This part of the nuclear energy is effective in replacing the electrostatic energy and by the process described above passes into heat in the deuteron gas. If the charge does not escape, all its energy goes into heat, but we do not consider this case at present.

The loss of heat from the deuteron gas is $3/2\ kT$ for each deuteron suffering nuclear transformation, since this is the energy it had before the change. For every unchanged deuteron striking the wall $2kT$ is given up as heat. Potential energy $eV$ is also lost, but this is regained when another charge is let in to replace it, or if the deuteron returns after collision with the wall.

The energy of the electric field is determined simply by the charges, since in a steady state the space distribution is constant.

The loss of electrons is $$\frac{N}{T_e}$$

per sec. and this requires, to balance it, an inflow $b$ of singly ionised molecules where $$\frac{N}{T_e} = b(1-g)$$

and $g$ is the fraction of molecules which get broken up before they introduce an electron.

The loss of deuterons is $$\frac{N}{T_d} + S$$

where $T_d$ is the life of a deuteron before disintegration and S is the loss of unchanged deuterons. The gain is $2b(1-g')$ where $g'$, the efficiency for introducing deuterons, is nearly equal to $g$. We will neglect the difference.

Thus $$\frac{N}{T_d} + S = \frac{2N}{T_e} + B + S' \qquad (10)$$

where B represents a possible input of atoms which, losing an electron near the wall, will come in as deuterons, and S' the deuterons rebounding from the wall.

The heat lost by the unchanged deuterons to the wall is $2\ kT.S$. The power lost and radiated by the electrons is $$\frac{eVN}{T_e}$$

The power required to replenish the magnetic field is $$\frac{2E_m}{T_e}$$

If W be the nuclear energy released per deuteron transformed, the energy carried into the walls by the products of transformation per sec. is $(W-eV+3/2kT)\frac{N}{T_d}$ including the neutrons;

the whole release of nuclear energy is $$W\frac{N}{T_d}$$

Hence $W_S$ the power required from the electromagnetic wave or potentials applied to the electrodes is given by $$W_S+\frac{WN}{T_d}=(W-eV+3/2kT)\frac{N}{T_d}+2kTS+V_e\frac{N}{T_e}+2\frac{E_m}{T_e}$$

$$W_S=eVN\left[\frac{1}{T_e}-\frac{1}{T_d}\right]+2kT.S+3/2kT\frac{N}{T_d}+2\frac{E_m}{T_e}$$

or, assuming $B=0$ $$W_S=eVN\left[\frac{1}{T_e}-\frac{1}{T_d}\right]+kTN\left[\frac{4}{T_e}-\frac{1}{2T_d}\right]+2\frac{E_m}{T_e}+2kT.S' \quad (11)$$

If $$\frac{2}{T_e}>\frac{1}{T_d}$$

$S$ will be positive even if $B=0$ since $S'$ is a fraction of $S$.

$$\frac{2}{T_e}<\frac{1}{T_d}$$

it will be necessary to introduce B to make S positive and control the potential.

The above assumes that the applied energy can be converted to heat. This is true, since increase of current will result in the current filaments drawing in closer and so increasing the excess of electrons near the centre. This in turn increases the electrostatic energy and so the kinetic energy of the particles is sucked in.

We must now consider in more detail some of the points referred to above.

*Loss of heat to the walls.*—There will always be a certain number of energetic molecules which are able to reach the wall against the electrostatic field. These will be included in S which cannot therefore fall to zero whatever the values of $T_d$ and $T_e$. It is worth investigating further the minimum value of this quantity. If $n_0$ is the number of deuterons per cc. at the centre, the number at the wall is $$n_0\epsilon^{-eV/kt}$$

where $\epsilon$ is the base of Napierian logs.

The energy carried to the walls is $$n_0\epsilon^{-eV/kT}\frac{vd}{\sqrt{\sigma\pi}}.2kT \text{ per sq. cm. per sec.}$$

We want this to be a small fraction $\eta$ of the energy supplied to the system by disintegration which is $$\frac{3}{2}\sqrt{2}.v_d.\sigma.n_0^2 eV \text{ per cc.}$$

assuming, as we have done that for each primary disintegration three charges eventually reach the walls. Hence $$\frac{2}{\sqrt{6\pi}}.n_0\epsilon^{-eV/kT}v_d.kT.A=\frac{3}{2}\eta\sqrt{2}v_d\sigma n_0^2 C.eV$$

Therefore $$\frac{\epsilon^{-eV/kT}}{eV/kT}=\frac{3}{2}\sqrt{3\pi}.\eta\frac{C}{A}.\sigma.n_0$$

For a torus $C/A=R/2$ take $n_0=3\times 10^{14}$, $\sigma=8\times 10^{-26}$, $R=30$ cm.

$$\frac{\epsilon^{-eV/kT}}{eV/kT}\sim\frac{3}{2}\eta\times 10^{-9}$$

Thus if $$\frac{3}{2}\eta=\frac{1}{10}, \quad \epsilon^{-eV/kT}=10^{-10}\frac{eV}{kT}$$

this gives $eV=20$ $kT$ almost exactly, which is the value we have taken so far.

A small increase in $eV$ will decrease $\eta$ greatly. Thus, if $$eV=22.5kT, \frac{3}{2}\eta=\frac{1}{100}$$

As long as S is an appreciable fraction of the total flow, the voltage will be self-stabilising since a decrease in V will increase S and so restore the value of V. If $Ve/kT$ was so large that this effect was inappreciable, it might appear that V would be unstable and fluctuate badly, but at high voltages the field begins to stop the escape of the products of disintegration which acts as a stabilising mechanism in just the same way. If the values of $T_d$ and $T_e$ are such that $B+S'>S$ the voltage can be adjusted by controlling B. If $S>B+S'$ the voltage will adjust itself to give this value.

It is not necessary to take account of the kinetic energy of drift $E_D'$ in considering the energy lost by collision with the wall. When any group of charges, such as those admitted as a molecule, return to the wall, their net drift momentum is zero. This remains true in spite of all interactions with other charges by collision or disintegration provided all the charges interacting are considered as one group. It is true that this consideration would not by itself prevent the electrons and deuterons severally carrying to the wall considerable energy associated with drift velocity since they might be going consistently in opposite directions. We know however that the drift of the electrons is fixed by the equilibrium between electric and magnetic fields at a moderate value $\sim 10^9$ cm./sec., even after being increased by synchrotron action, thus that of the deuterons must be only 1/3700 of this at the wall and the associated energy is negligible.

*Loss by charge exchange.*—Energy losses are possible as a result of charge exchange between the molecules admitted and the free deuterons. The neutralised deuterons, not being restrained by the electric field, may strike the walls and convey heat energy to them.

A molecule admitted to the torus will have a velocity of the order of $10^5$ cm./sec. It is subject to ionisation by the nuclei, by the electrons and by the quanta of radiation present in the torus. Of these the first is the most important, the cross-section for this process being of the order $10^{-16}$ cm.$^2$ for 100 kv. nuclei. It is also liable, as we have just said, to a collision which results in the nucleus being neutralised and the molecule left as a positively charged ion. This process also has a cross-section of the order $10^{-16}$ cm$^2$. The time that elapses till one or other of these processes occurs is $$\frac{1}{n(\sigma_2+\sigma_3)V_d}$$

where $\sigma_2$, $\sigma_3$ are the cross-sections respectively for ionisations and charge exchange of a deuterium molecule by a nucleus. With $n\sim 3\times 10^{14}$, $V_d\sim 3\times 10^8$ cm./sec. the time is of the order $10^{-7}$ sec. so the molecule would go only some .1 mm. before undergoing a change which leaves it with a positive charge. We have taken here the mean value of $n$, near the wall the actual value of $n$ is of course enormously smaller. What the calculation means is that the first process will occur almost as soon as the molecule enters a region in which there is an appreciable density of deuterons; calculations suggest that this is not far from the physical wall. It now comes under the influence of the field and is rapidly accelerated to a velocity $\sim 10^8$ cm./sec. so that its next effective collision may be expected to occur in a distance much greater than that required for the first. How much greater will depend on the distribution of the electric field on which our present approximation tells us little, but we may take it as of the order of 10 cm., comparable, that is, with the diameter of cross-section of the torus.

The second effective collision may do one of two things; it may (a) ionise the molecule further into a free electron and two nuclei, or (b) transfer the electron to the colliding nucleus which will become neutralised, the nuclei of the original molecule falling apart under their mutual repulsion.

Neutralised nuclei may reach the walls as the result of either the first effective collision or of the second. Consider the former first. The fraction $$\frac{\sigma_3}{\sigma_2+\sigma_3}$$

of the molecule will suffer charge exchange.

Half of the nuclei so neutralised will be directed toward the near wall and will probably reach it, since it is so near. A fraction of those directed away from the wall will themselves undergo exchange rather than ionisation; if so, the electron has a fair chance of escape as a neutral. We may estimate the chance of an inwardly directed neutralised electron so escaping as $$\sim \frac{\sigma_{3'}}{2(\sigma_{2'}+\sigma_{3'})}$$

where $\sigma_{2'}$, $\sigma_{3'}$ refer to an atom.

We thus have, if $b$ molecules are let in, that $$\frac{b\sigma_3}{2(\sigma_2+\sigma_3)} \text{ nuclei}$$

are lost from a region near the wall $$\frac{b}{4}\frac{\sigma_3}{(\sigma_2+\sigma_3)}\cdot\frac{\sigma_{3'}}{(\sigma_{3'}+\sigma_{3'})}$$

are lost from somewhere well inside the torus. In addition $$\frac{\sigma_{3''}}{\sigma_{2''}+\sigma_{3''}}$$

of the singly ionised molecules will lose their electrons by charge exchange and in perhaps half the cases the electron is carried to the wall.

Thus in all we have introduced $$b\left(1-\frac{\sigma_{3''}}{2(\sigma_{2''}+\sigma_{3''})}\right)\text{electrons} \equiv b(1-g)$$

and $$2b-\frac{b\sigma_{3/2}}{\sigma_2+\sigma_3}-\frac{b\sigma_3\sigma_{3'}}{4(\sigma_2+\sigma_3)(\sigma_{2'}+\sigma_{3'})}$$

$$-\frac{b\sigma_{3''}}{2(\sigma_{2''}+\sigma_{3''})}=2b(1-g')\text{ deuterons}$$

In the earlier paragraphs we have ignored the difference between $g$ and $g'$ which seems unlikely to be large. If $\sigma_2=\sigma_3$ etc. which is not far off true, $g=\frac{1}{4}$, $g'=\frac{7}{8}$.

The loss of deuterons to the walls is $$b\left[\frac{\sigma_3}{2(\sigma_2+\sigma_3)}+\frac{\sigma_3\sigma_{3'}}{4(\sigma_2+\sigma_3)(\sigma_{2'}+\sigma_{3'})}+\frac{\sigma_{3''}}{2(\sigma_{2''}+\sigma_{3''})}\right]$$

or say $b/2$.

Now $$b=\frac{N}{T_e(1-g)} \therefore b/2=\frac{N}{T_e(2-2g)}\sim\frac{N}{3/2\,T_e}$$

The heat transferred by these neutral deuterons striking the wall is thus $$\frac{3/2\,KTN}{3/2\,T_e}=\frac{KTN}{T_e}$$

which must be added to the R.H.S. of (11).

Power to maintain magnetic field

This is required independent of any consideration of heat supply and, even if the energy from the nuclear disintegrations were more than enough for the heat, would still be needed. It is $2E_n/T_e$ where $E_n \sim 7\times 10^5$ Joules and $T_e \sim 100$ sec. The power required is thus 14 kilowatts. It is a small term compared with the others in the expression (11) for $W_s$ but if they are negative, as they conceivably might be, it cannot be balanced against them, since alone among the forms of energy the magnetic field has a sense.

Total power

This power can be estimated as follows:

Rate of disintegration per sec. $=\frac{1}{2}n^2\cdot\sigma\cdot V_d\sqrt{2}$

For 200 kv. collisions take $\sigma=8\times 10^{-26}$: $V_d$ for $kT=50$ kv.

$$\therefore \text{Disintegrations/sec.}=\frac{n^2}{\sqrt{2}}8\times 10^{-26}\times 2.7\times 10^8$$

$$=15\times 10^{-18}\times n^2 \text{ Mean life } T_d=\frac{10^{17}}{4.5n}\sim 70 \text{ sec.},$$

since 3 deuterons in effect are destroyed by each disintegration.

Note that at this voltage $$\frac{T_e}{T_d}=\frac{22}{3}\times\frac{\beta^3 f}{\sqrt{1-\beta^2}}$$

$f$ being nearly unity if $$nr_o^2 > 3\times 10^{16}$$

Energy produced at 21 m.e.v. per disintegration (including seconding reactions) is $$15\times 10^{-18}\times n^2 \times \frac{21\times 10^6}{300}\times 4.8\times 10^{-10} \text{ ergs/cc./sec.}$$

$$=500\times 10^{-24}\times n^2 \text{ ergs/cc.}=5\times 10^{-29}\times n^2 \text{ watts/cc.}$$

Power requirements

From (11) modified by consideration of charge exchange, we have $$W_s=eVN\left[\frac{1}{T_e}-\frac{1}{T_d}\right]+kTN\left[\frac{5}{T_e}-\frac{1}{2T_d}\right]+\frac{2E_m}{T_e}$$

Since $eV \sim 20kT$ we can write this approximately as $$W_s=kTN\left[\frac{25}{T_e}-\frac{20}{T_d}\right]+\frac{2E_m}{T_e}$$

$T_e$ and $T_d$ are both of the order 100 secs., so that bracket if positive is probably of the order $\frac{1}{10}$. For a 2000 litre vessel and $kT$ corresponding to 50 kilovolts, $kTN$ in Joules is $$\frac{5\times 10^4\times 4.8\times 10^{-10}\times 2\times 10^6\times n}{300\times 10^7}=\frac{1.6\times n}{10^8}$$

so $W_s$ in kilowatts $$\sim \frac{1.6\times n}{10^{12}}\sim 500 \text{ kilowatts}$$

Clearly the term $$\frac{2E_m}{T_e}$$

is quite negligible in comparison.

Such a power requirement would perhaps be acceptable, but it is a lot of power to put steadily into a device of the synchrotron type. It is worth noticing that the main part of the energy content of the system is the kinetic energy of the deuterons: $3/2kTN+$ a somewhat larger amount due to the drift, say $4kTN$ in all. This would take 40 sec. running with 500 kilowatts to build up, neglecting losses.

It is clear that the important thing is to make $T_e > 1.25 T_d$. In that case the power required for steady running becomes quite small. If the term in the bracket is negative the system will heat up spontaneously and the potential will rise until it stops the emission of a considerable proportion of the charged products of dissociation. The first consequence of the rise in potential is to stop the particles which approach the walls obliquely and this will not be effective, since any such particles being retained have their whole energy available for heating the gas and not merely that part of it associated with motion against the potential gradient. Eventually, however, the potential will rise so far that the mean energy given up per charge will not sufficiently exceed $V_e$ to provide for the other losses and a steady state will then result, apart from the steady growth of inert nuclei in the torus.

*Relative yield*

The power produced with $V=10^6$ volts is $5 \times 10^{-29} \times n^2$ watts/cc. The input power required is $8 \times 10^{-16} \times n$ watts/cc. assuming $$\frac{25}{T_e} - \frac{20}{T_d} = \frac{1}{10}$$

The ratio is $$\frac{8}{5} \times \frac{10^{13}}{n}$$

which for $n=4 \times 10^{14}$ is 4%.

This assumes the quite arbitrary value of 1/10 for $$\left\{\frac{25}{T_e} - \frac{20}{T_d}\right\}$$

it shows the importance of keeping this quantity really small.

*Neutron yield*

The production of neutrons per sec. is $$\frac{N}{3T_d} \sim \frac{2 \times 10^6 \times 4 \times 10^{14}}{200} = 4 \times 10^{18}$$

If half these are absorbed in $U_{238}$ they will produce $$\frac{2 \times 10^{18} \times 239}{6 \times 10^{23}} \text{ grs./sec.} \approx 8 \times 10^{-4} \text{ grs./sec.} \sim 75 \text{ grs./day}$$

of plutonium. This from an estimated power consumption of 500 kilowatts.

*Equilibrium, stability and control*

We have three parameters V, T and N and two controls, $b$ and $W_S$ at our disposal. Consider first the case in which all the products of disintegration reach the wall. There are two equations for the conservation of matter:

(A) $\quad b(1-g) = \frac{N}{T_e} = aN^2 T^{-3/2}$ since $T_e \propto v_e^3$ and there is approximate equipartition between the electrons and gas.

(B) $\quad 2b(1-g) = \frac{N}{T_d} + S - S^1 = N^2 f(T) + qS$ where $f(T)$ is an increasing function of T and $q$ is a proper fraction $\sim 1$.

There is also the equation of energy (C) $\quad W_S = N^2 h T^{1/2} + 2kTS + \frac{kTN}{T_e} + 2\frac{E_m}{T_e} - N^2 Vef(T)$ where the first term represents the radiation which varies as $v_e$ and $h$ is a numerical constant. The third and fourth terms are never large and in this rough outline will be ignored.

Two regimes are conceivable; in one $eV \gg 20\, kT$ and $S=0$ to a great accuracy. In the other $eV \approx 20kT$ and $S \neq 0$.

*Case $S \neq 0$.*—This is the case we have considered so far. In all terms except S itself, we can take $eV=20kT$, and so we have 3 equations for 5 quantities, S, T, N, $b$ and $W_S$. Thus fixing two, e.g. $b$ and $W_S$, should give us definite values for the others. However there is the restriction that all the quantities must be positive and it remains to be seen if a solution exists.

Eliminate S from B and C:

$$W_S = N^2 h T^{1/2} + \frac{4ak}{q} N^2 T^{-1/2} - N^2 k T f(T) \left[20 + \frac{2}{q}\right]$$

Hence $$\frac{W_S}{b(1-g)} = \frac{h}{a} T^2 + \frac{4kT}{q} - \frac{kT^{5/2}}{a} f(T)\left[20 + \frac{2}{q}\right]$$

Now $f(T)$ vanishes for T less than a few kilovolts, so the R.H.S. is positive for small T. It will increase to a maximum at a certain value of T and then diminish to zero (see FIG. 3).

Hence for all values of $$\frac{W_S}{b(1-g)}$$

less than a certain maximum value there will be two values of T, $T_1$ and $T_2$ satisfying the equation. $T_1$ will increase with $W_S/b$, while $T_2$ will diminish. Now S must be positive, so $T_e < 2T_d$ or, $f(T) < 2aT^{-3/2}$. It is probable that this condition will normally be fulfilled especially round $T_1$, it may exclude $T_2$ in some cases or rather drive it into the regime where $S=0$.

Again suppose we fix N and T and see what S, $b$, $W_S$ must be to fit. Equation A determines $b$ and shows right away that $b$ increases with N and diminishes with T. Equation B then gives S which is $$\frac{N}{q}\left(\frac{2}{T_e} - \frac{1}{T_d}\right)$$

this is probably positive, but if there is any range of T for which it is not, equilibrium is only possible if atoms of deuterium are let in as well as molecules. At $T_e=2T_d$ we pass to Case II with $S=0$. $W_S$ is given by C and is positive for all values of T less than an upper limit $T_{Max}$ independent of N. When we consider the retention of products of disintegration this upper limit may disappear and $W_S$ be positive for all T.

*Case II $S=0$.*—Here $T_e=2T_d$, which fixes a relation between V and T. We also have that $eV \gg 20kT$ to prevent the deuterons escaping. Incoming molecules receive energy $\sim eV$ and will pass this on gradually to the deuterons, though the process is rather slow, having a time constant $\sim T_d \sim 100$ secs. If $S=0$ the deuterons lose energy only through the electrons, which then radiate it. They must therefore be "hotter" than the electrons. $T_e$ increases with V without limit and $T_d$ diminishes as T increases in the range we have to consider. Both vary as $N^{-1}$. The condition can only be satisfied at high V and high T, if indeed it can be satisfied at all, for when V is high the torus will retain products of disintegration which increase $T_d$ for the purpose of equation B, besides of course making the equilibrium state a transitory one.

Assuming that it is possible, we have $V=Q(T)$ where Q is a function derived from $T_e=T_d$ also $$2b(1-g) = N^2 f(T)$$

and $W_S = N^2 h T^{1/2} - N^2 eV \cdot f(T)$. As before, $$\frac{W_S}{2b(1-g)} = \text{a function of T only}$$

In the case we have worked out above, $$N^2 h T^{1/2} \approx \frac{1}{2} N^2 eV f(T)$$

while $T_e < 2T_d$. Since $Vf(T)$ will increase with T faster than $T^{1/2}$ the condition $T_e=2T_d$ will never be satisfied for $W_S > 0$. However, the calculations are rough and we cannot exclude the case completely. It would probably be unstable. The need for working at $S=0$ could be avoided by keeping $S \neq 0$ and admitting a stream of atomic deuterium. This will become ionised near the wall and deuterons will go in without a corresponding increase of electrons. By choosing this admission right, equations corresponding to A and B can be satisfied for any desired S.

*Stability.*—Assuming that a regime has been found in which the conditions of equilibrium are satisfied, we must next consider if the equilibrium is stable. In this approximate study we shall not consider oscillations in which the conditions are different in different parts of the torus, but only changes in the overall parameters V, T, N, such as might be caused by changes in $b$ or $W_S$ or by random fluctuations.

Consider first Case I when $S \neq 0$, and suppose $b$ is kept constant. Suppose V rises for any reason i.e. the centre of the torus gets more negative. The flow of deuterons to the wall will diminish, leaving more positives in the gas and so reducing V, since the inflow is supposed to continue unchanged. This is a very rapid process with a time constant of the order $10^{-4}$ sec. and a powerful one, since S varies exponentially with V if T is kept constant. It is true that over a long period T will not remain constant, in fact for slow fluctuation T varies as V since $eV \approx 20kT$. The mechanism which brings this about is as follows: increase in V increases the energy of the incoming particles which in time transfer energy to the gas, also the decrease in S reduces the cooling effect on the gas resulting from the loss of its faster atoms to the walls. Both these effects have a time constant of the order $T_d$ a million times greater than that of the first effect. Another destabilising effect is the change in $T_e$. If T increases, the mean velocity of the electrons, which are roughly in thermal equilibrium with the positives (see column 9, line 15) increases and with it $T_e$. Thus the electrons stay longer and their accumulation tends to raise V. Here again the time constant is of the order $T_e$ or $T_d$, and the effect is not a strong one since $T_e$ only goes as $T^{3/2}$.

Thus we may safely conclude that in Case I V is stable. If V is stable and $W_S$ is kept constant, T must also be constant, since a small variation in $eV/kT$ produces a great and immediate change in S and so in $W_S$. In fact $eV \approx 20kT$ for all the terms except S itself. A chance fluctuation of T with constant V is obliterated because it alters the loss of heat to the walls. The system is stable against random temperature fluctuations in the same way as an evaporating liquid.

Figure 3:
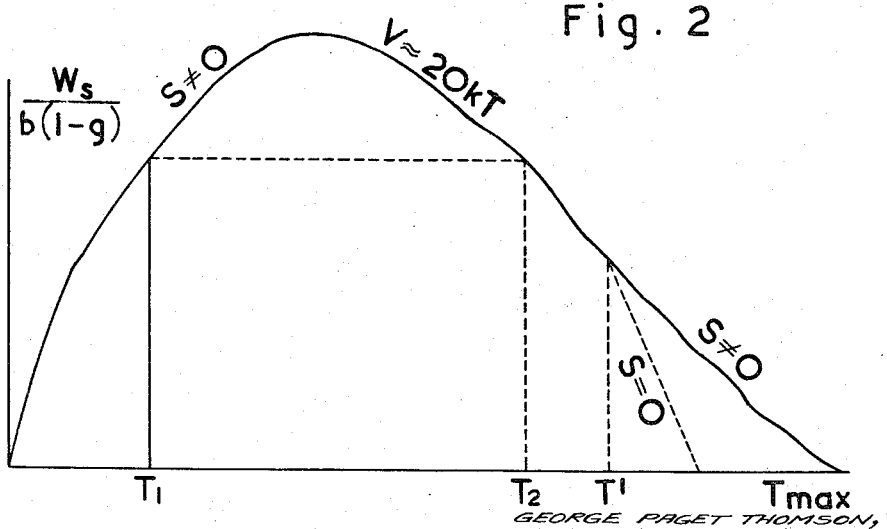
FIG. 3 is a curve referred to in the theoretical discussion.

Now suppose $W_S$ varies. The first effect of an increase in $W_S$ is to pull the lines of current closer and so increase V, this as we have seen will lead to an increase in T. If the equilibrium is at $T_1$ (FIG. 3) this effect will bring the regime to the new equilibrium conditions. If the equilibrium is at $T_2$, the effect of the change is to change T in the wrong direction, though of course the system will not be in equilibrium. However there seems no mechanism to bring it back by using up the power.

$$qS = N\left(\frac{2}{T_c} - \frac{1}{T_d}\right)$$

and decreases with increasing T while the term $N^2 eVf(T)$ in "C" (column 16) which diminishes the equilibrium value of $W_S$ gets more important. The increase in $kT$ and in radiation loss does indeed offset these to some extent, but the fact that (FIG. 3)

$$\frac{W_S}{b(1-g)} = \frac{h}{a}T^2 + \frac{4kT}{q} - \frac{kT^{5/2}}{a}f(T)\left[20 + \frac{2}{q}\right]$$

is decreasing with T shows that they are inadequate. It would seem that the equilibrium at $T_2$ is unstable against change of $W_S$ while that at $T_1$ is stable. Retention of disintegration products does not help here, since to begin with it increases the energy retained.

Consider now change of $b$. We have $$N^2 = \frac{b}{a}(1-g) T^{3/2}$$

At $T = T_1$, increase of $b$ decreases the equilibrium $T_1$; without knowing more about the shape of the curve we cannot say if $bT^{3/2}$ will increase or not. The immediate effect of putting in more gas is to drop V and T because two positives come in for each electron. The secondary effect of this drop is to diminish the rate of reaction which tends to allow the gas to accumulate. On the other hand S may increase, depending on the exact variation of V and T and this may result in a net loss of gas as an ultimate consequence of the increased inflow. It does not seem that this necessarily involves an instability. As far as the temperature is concerned the effect of an increase of "$b$" is in the direction of the new equilibrium, namely a decrease in temperature. The possibility that the first effect of admitting the gas, which must necessarily be increase in density, is followed by a reaction which may lead to a lower final pressure does not necessarily imply instability.

The control can, in fact, be maintained as follows: keep V and T constant by altering $W_S$. This process is almost instantaneous. Fluctuations in N will normally be slow since $T_d \sim 100$ sec. They can be controlled by altering $b$ at constant T; under these circumstances $N \propto \sqrt{b}$.

*Case II, $S = 0$.*—We have seen that there may be equilibrium of this kind in some cases, so its stability needs consideration. Suppose that V is already $>20kT$ and rises above an equilibrium value. Will T follow it? There are several reasons why it should. (1) If V rises, $v_e$ will rise also, assuming T fixed. The electron has more energy to lose and its loss from radiation goes as $T_e \times v_e$ or $v_e^4$. Thus $v_e$ will rise, though not much. In the case we considered there was nearly equipartition between electrons and positives as a mere matter of accident, but whether this is so or not the rise in $v_e$ will result in a rise of T since either more energy will be transferred to the positives or less taken from them. The time constant for this process is of the order of a few seconds.

(2) If V is already in the million volt region increasing it will retain more disintegration products. This reduces V quickly by direct electrostatic action. It also increases T since the whole energy of the nuclei retained is available for heat. Time constant of the order 100 secs.

(3) If V increases, the incoming deuterons will get more energy and this energy in time will result in rise of T. Time constant of the order 100 secs.

We may fairly conclude that V and T will be closely linked together, when $eV \gg 20kT$. But in spite of this it seems almost certain that the regime $S=0$ is unstable. The arguments are the same as made it likely that $T_2$ is a point of unstable equilibrium.

The instability, however, would not lead to any serious explosion. The time constant for the reaction is of the order 100 secs. and would not greatly change however much the temperature rose, since the cross-sections for the D—D reactions have maxima not very far above the temperature we propose to work at. With such a slow instability it might even be possible to keep it steady by working the controls, though it would probably be better to work with $S \neq 0$.

*Accumulation of waste products*

So far we have assumed that all charges reach the wall after distintegration, and also that both the $He^3$ and the $H^3$ are consumed in the reactions as noted above. It is necessary now to consider how far these conditions are likely to be fulfilled and what difference it will make if they are not. The initial reactions are $$H^2 + H^2 \rightarrow He^3 + n + 3.36 \text{ mev.} \qquad (A)$$
$$H^2 + H^2 \rightarrow H^3 + H^1 + 3.97 \text{ mev.} \qquad (B)$$

In each case the heavy particle gets ¼ of the energy or rather less than 1 mev. In case A, the particle has a double charge and could only escape in the most favourable circumstances against a field of 400 kv. With such a low field as this there would either be a great loss by conductivity or the temperature would be so low that the cross-section would be small. It is probable that we must reckon on the $He^3$ being retained. The $H^3$ would be able to reach a wall against a potential of nearly 1 mev. if it were shot towards it normally. We may expect that a substantial, though varying, part of the H³ will escape. However, the reaction $$H^3 + H^2 \rightarrow He^4 + n\, 17.6 \text{ mev.} \quad (C)$$

occurs with a very large cross-section of the order of 100 times that for reactions A and B. Any H³ that is retained will react almost at once, and it will be desirable to recover any H³ that is pumped away and mix it with the feed. Apart from the heat loss of $3/2kT$ when it strikes the wall, which is negligible compared with the 17.6 mev. produce in C, this comes to nearly the same thing as if all the tritium reacted in the torus, which is what we have supposed so far. The $He^4$ will get $$\frac{17.6}{5} = 3.5 \text{ mev.}$$

and in spite of its double charge will frequently escape at once to the walls. However there will always be a certain proportion of cases in which the initial motion is so oblique to the walls that the particle is trapped. Unless it gets out immediately it has practically no chance of doing so. Collisions will reduce its energy to that of equipartition, and with its double charge its chance of escape is negligible. Clearly the fraction retained will depend rather critically on V, and this accumulation of helium will gradually bring the action of the torus to a stop. This is a reason for working at as low a value of V as is compatible with a reasonably high cross-section for reactions A and B. This accumulation is difficult to calculate, but it seems likely that the torus could run for a considerable multiple of $T_d$ even with V as high as 1 mev.

The accumulation of $He^3$ is limited by the reaction $$He^3 + H^2 \rightarrow He^4 + H^1 + 18 \text{ mev.} \quad (D)$$

There seems little evidence on the cross-section for this reaction. If it is large we get the same result as for C, namely a slow accumulation of $He^4$. If it is small the $He^3$ will accumulate much more rapidly and the condition that most of the charges produced by disintegration go to the walls, on which we have worked so far, ceases to be even approximately true.

In what follows we shall re-examine the behavior under these new conditions to see how far a quasi-steady state is possible during the period before enough $He^3$ has accumulated greatly to increase $T_d$.

To do this we must calculate the energy left in the gas. We see that, assuming reactions A and B equally probable which is roughly true, 5 deuterons give one $He^3$, one $H^1$, one $He^4$ and two neutrons. We now assume that both the heliums stay in the torus, the least favourable case.

Let $W_1$ be energy from reaction A
$W_2$ be energy from reaction B
$W_3$ be energy from reaction C.

There will be $$\frac{N}{5T_d}$$

reactions of each kind per sec. The power produced is $$\frac{N}{5T_d}(W_1 + W_2 + W_3)$$

The energy carried to the wall in A is that of neutron i.e. $3W_{1/4}$, in B it is that of $H^1$ or $3W_{2/4} - eV$, in C that of the neutrol or $3W_{3/4}$.

Therefore energy left in the gas $$= \frac{N}{5T_d}\left(\frac{W_1}{4} + \frac{W_2}{4} + eV + \frac{W_3}{4}\right)$$

$$= \frac{N}{20T_d}(W_1 + W_2 + W_3 + 4eV)$$

As before $$\frac{N}{T_e} = b(1-g)$$

to replace electrons. The loss of positives is now $$\frac{N}{5T_d} + S$$

Therefore $$\frac{N}{5T_d} + S = 2b(1-g^1) + S^1$$

As before take $g = g^1$ therefore $$\frac{N}{5T_d} + S - S^1 = \frac{2N}{T_e}$$

The power lost by the electrons, mostly radiated, is $$\frac{eVN}{T_e}$$

The power for replacing the magnetic field is $$\frac{2E_M}{T_e}$$

as before; that lost by deuterons striking the wall is $2kTS$; that lost by neutrals is approx.

$$\frac{b}{2} \cdot \frac{3kT}{2}$$

as before. Hence the energy equation now runs $$W_s + \frac{N}{20T_d}(W_1 + W_2 + W_3 + 4eV)$$

$$= \frac{N}{T_e}eV + \frac{2E_M}{T_e} + 2kT_S + \frac{3}{4}bkT$$

With $W_1 + W_2 + W_3 \sim 25$ mev.; $kT \sim 1/20$ mev.; $g \sim 1/4$
Hence $$W_s - \frac{2E_M}{T_e} = N\left[\frac{1.25}{T_e} - \frac{1.43}{T_d}\right] + 2kT_S^1$$

The first term on the R.H.S. is the important one and $W_S$ will remain small as long as $$T_d < \frac{1.43}{1.25}T_e$$

or $$T_d < 1.14\, T_e$$

This is a rather less severe condition than when all the charges go to the walls (column 16); the heat retained in the gas from the products which stay there rather more than compensating for the electrostatic energy they would have given the system if they had reached the walls. Of course the condition is really less favourable than when reaction D occurs because of the rather rapid stifling of the system by the waste product.

In general, the retention of a fraction of the products of disintegration will help stability, since if V increases in absolute magnitude less positive charge will escape and V will diminish. In this way the case when $S=0$ will be brought into line with $S \neq 0$.

Construction

Figure 4:
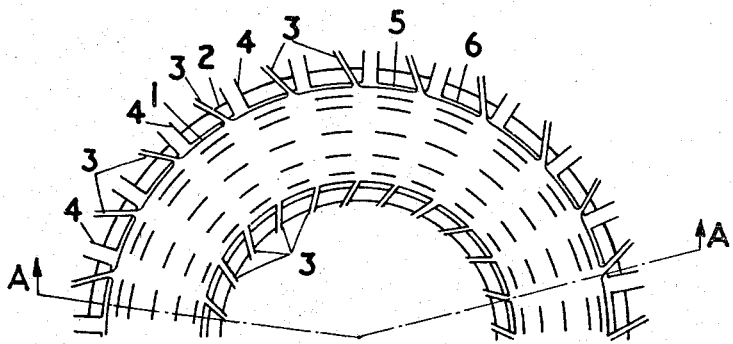
FIG. 4 is a horizontal sectional view in diagrammatic form of one diametral half of the device.
Figure 5:
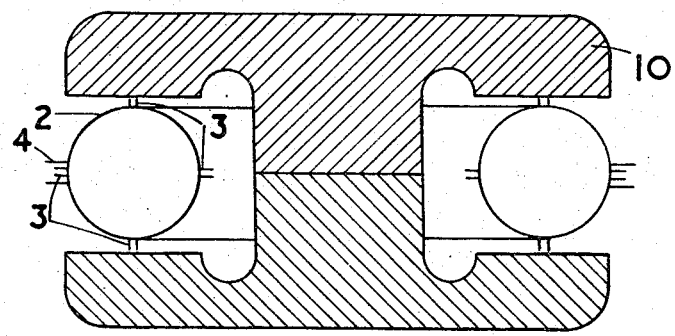
FIG. 5 is a vertical sectional view, also diagrammatic on the planes AAA marked in FIG. 4.

Referring now to FIGS. 4 and 5, a practical construction of device may comprise a non-magnetic metal toroidal reaction vessel 1 overall diameter of 4 meters, the internal diameter of the ring-shaped channel being 60 cms. Aluminum is attractive on account of its low neutron-capture cross-section and its resistance to sputtering and secondary emission but it has thermal limitations. If copper is used an internal coating of aluminium or aluminium oxide is desirable to reduce sputtering and secondary emission. The toroidal vessel 1 is made up of 12 sectors each insulated from the other and is enclosed in a cooling jacket 2 through which water or other suitable cooling fluid is pumped. Gas inlet ports 3 distributed around the toroid and passing through the cooling jacket are provided on the toroidal vessel. Outlet ports 4 interposed between the inlet ports communicate with an annular header 5 bounded by the vessel 1 and a shell 6. Slots 7 in vessel 1 permit gas to be drawn from the interior of vessel 1 into the header 5 and thence through outlet ports 4. The jacket 2 is insulated from the sectors of the vessel 1 and from the inlet and outlet ports 3 and 4.

The toroidal vessel 1 and its cooling jacket 2 are arranged in a magnetic field adjustable up to about 1500 gauss normal to the plane of the toroid. This magnetic field in the arrangement illustrated is provided by an electro-magnet 10 which also provides the magnetic flux for the betatron acceleration hereinafter described.

Figure 6:
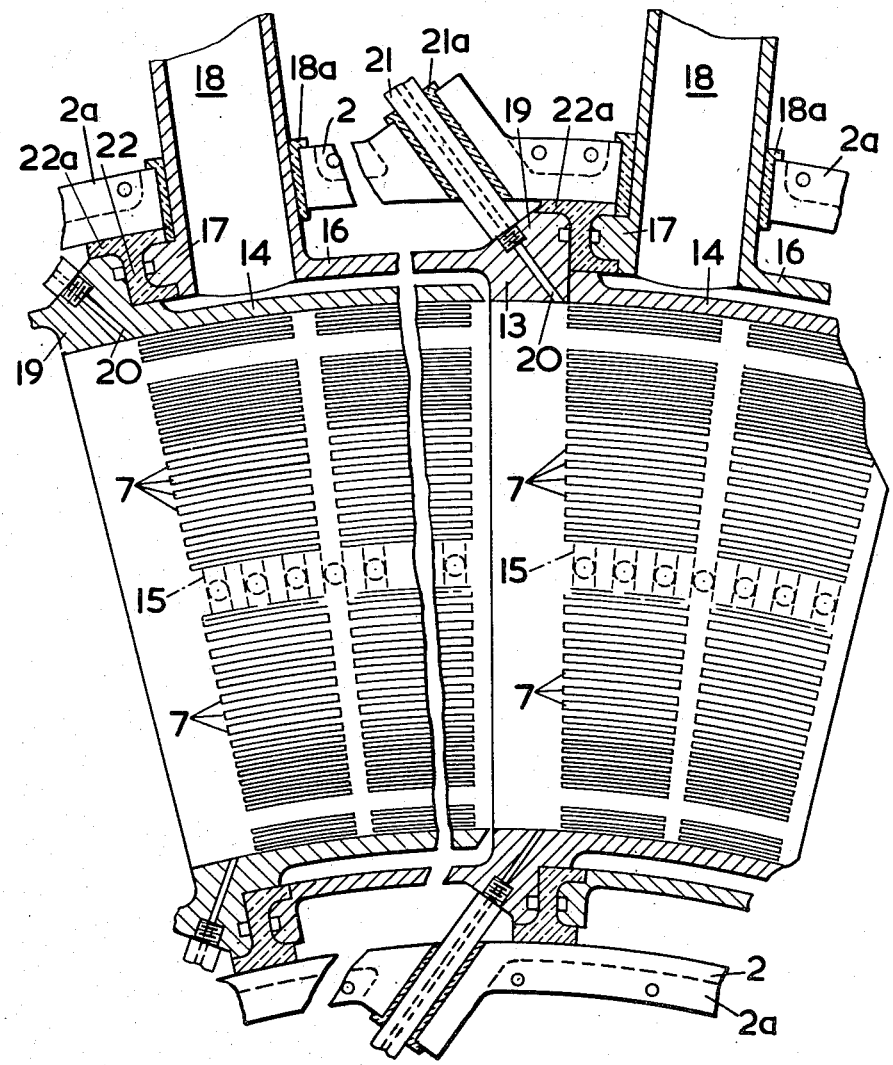
FIG. 6 is a horizontal section of one complete sector and fragments of adjacent sectors of the toroidal vessel shown diagrammatically in FIG. 4.
Figure 7:
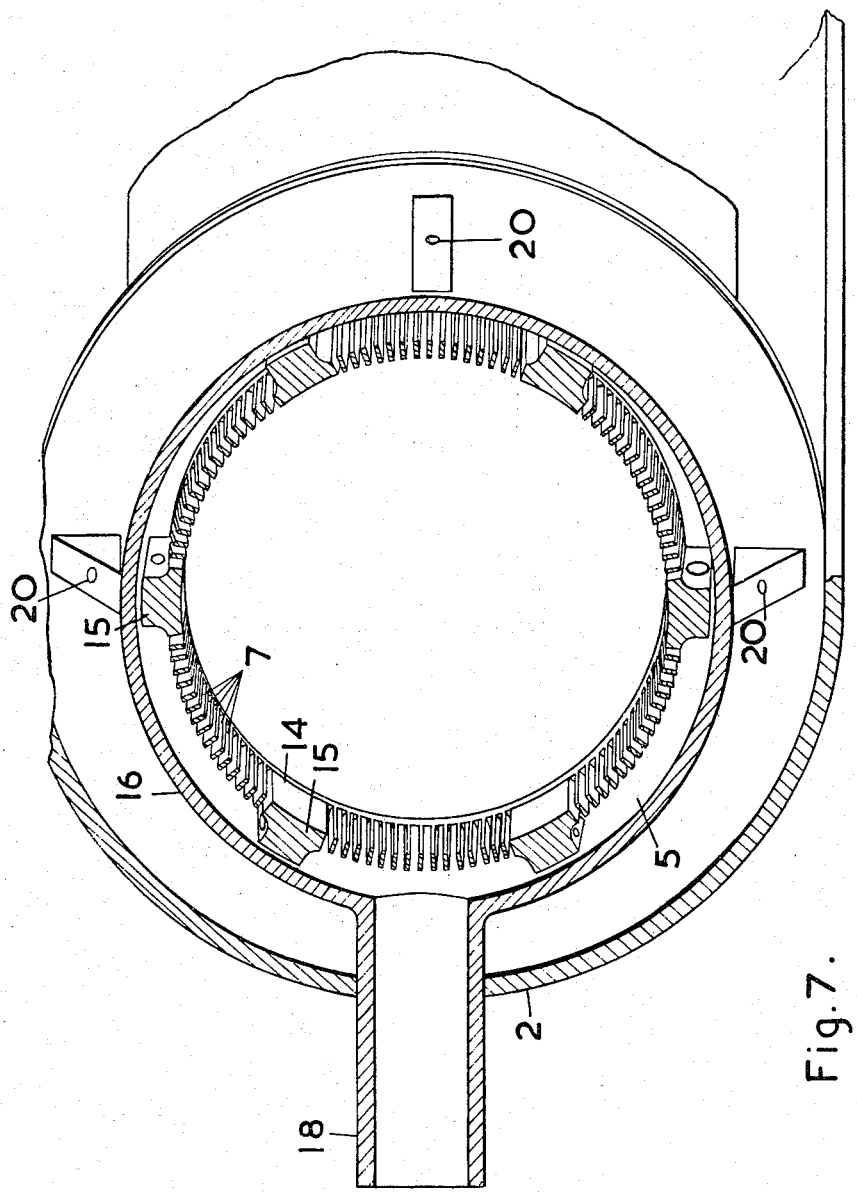
FIG. 7 is a view across the circular axis of FIG. 6.
Figure 8:
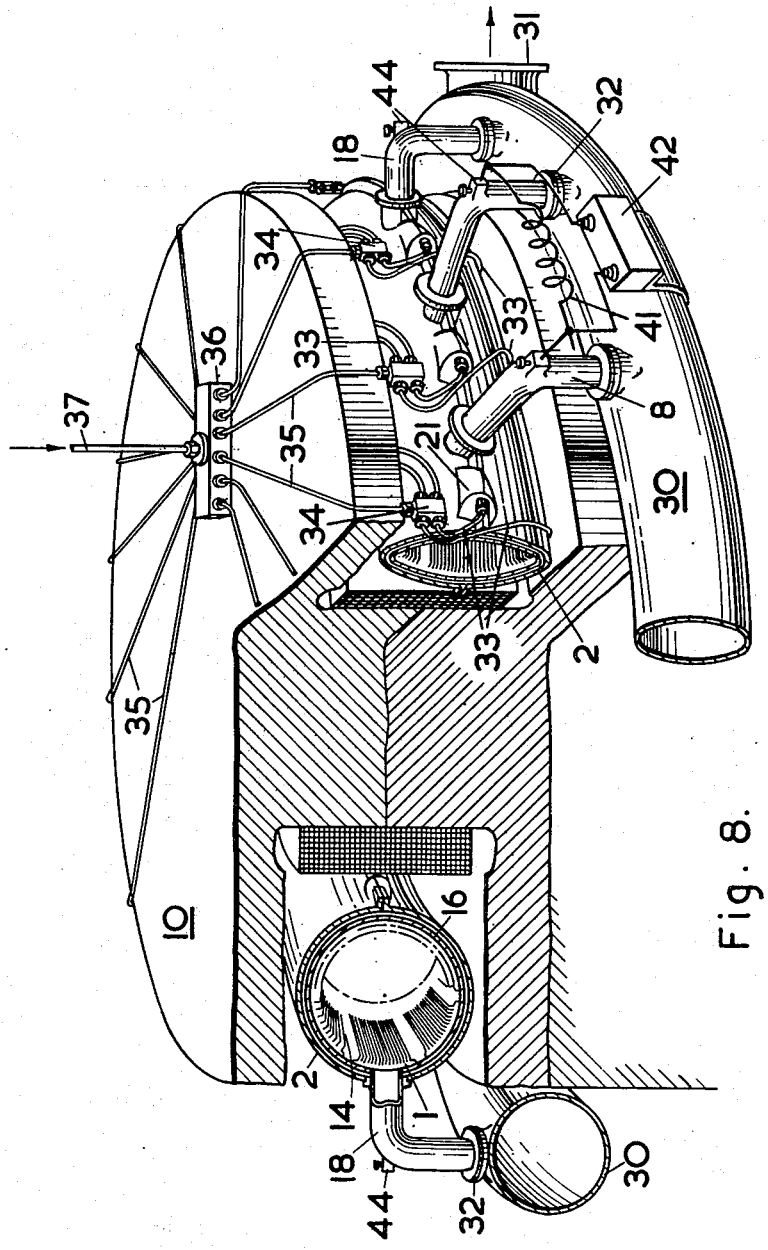
FIG. 8 is a broken-away perspective view of the assembled reactor.

FIGS. 6 to 8 show the construction of parts of the toroidal vessel and its accessories. Within the cooling jacket 2 which is built of upper and lower diametrically separate parts connected by flanges 2a (FIG. 6) are assembled a series (12 in this example) of similar overlapping tubular metal sectors 13 each having firstly a portion 14 serving as part of the toroidal reaction vessel 1 and having longitudinal slots 7 and longitudinal perforated strengthening ribs 15, secondly a portion 16 of larger diameter extending from the end of the first portion and terminating in a circular flange 17 and an exhaust pipe 18 constituting the outlet port 4 of FIG. 4, and thirdly a shoulder portion 19 joining the portions 14, 16 and drilled to provide inlet passages 20 and to take gas inlet pipes 21, these pipes and the passages 20 constituting the inlet ports of FIG. 4.

When these sectors are assembled within the split jacket 2 as shown the larger diameter portion 16 of one of them encircles the smaller diameter portion 14 of another of them and defines the outer boundary of the exhaust header and the inner boundary of the cooling fluid space. Washers 22 of an insulating material such as moulded Micalex are provided between each flange 17 and its adjacent shoulder 19 and outer cylindrical portions 22a of the washers serve to insulate the split jacket 2 from the sectors 13. The inlet pipes 21 and outlet pipes 18 are insulated from the jacket 2 by bushes 21a and 18a respectively.

The functional relationship of the parts described with reference to FIG. 6 will be readily appreciated by reference to FIG. 7. In FIG. 7 the shoulder portion 19 is shown as comprising a series of strengthening webs each drilled with passage way 20, the tubes 21 being omitted from this figure. Gas to be heated flows through passage ways 20 to the surface boundary of the toroidal reaction vessel. Gas from the reaction vessel is drawn through slots 7 into annular header 5 and out through exhaust pipe 18; the ribs 15 are perforated to permit the gas withdrawn from the vessel to flow round the header to the exhaust pipe.

The pipe system for supplying gas to, and withdrawing gas from, the reaction vessel 1 is shown in FIG. 8. The exhaust pipes 18 are each connected to a ring main 30, having an outlet 31, by a flanged electrically insulating joint 32. Each of the four inlet pipes 21 of each sector of the reaction vessel is connected by a pipe 33 made of insulating material such as polythene to a four-way manifold 34 fed in turn by a pipe 35 from a 12-way manifold 36 to which the main inlet pipe 37 is connected.

The sectors 13 are excited in succession at high frequency by electrical potentials derived from an H.F. oscillator 38 (FIG. 9) feeding an amplifier Y and, through a 90° phase delay circuit 39, an amplifier X. The outputs of the amplifiers are inductively coupled by loops 40 to the inductances of two of twelve resonant circuits each comprising an inductance 41 and a condenser 42 and connected in series to constitute a closed circuit transmission line 43 connected at a point between each adjacent pair of said circuits to one of the twelve sectors 13. The two inductances 41 to which coupling is made are spaced, as shown, 90° apart around the transmission line 43.

Figure 9:
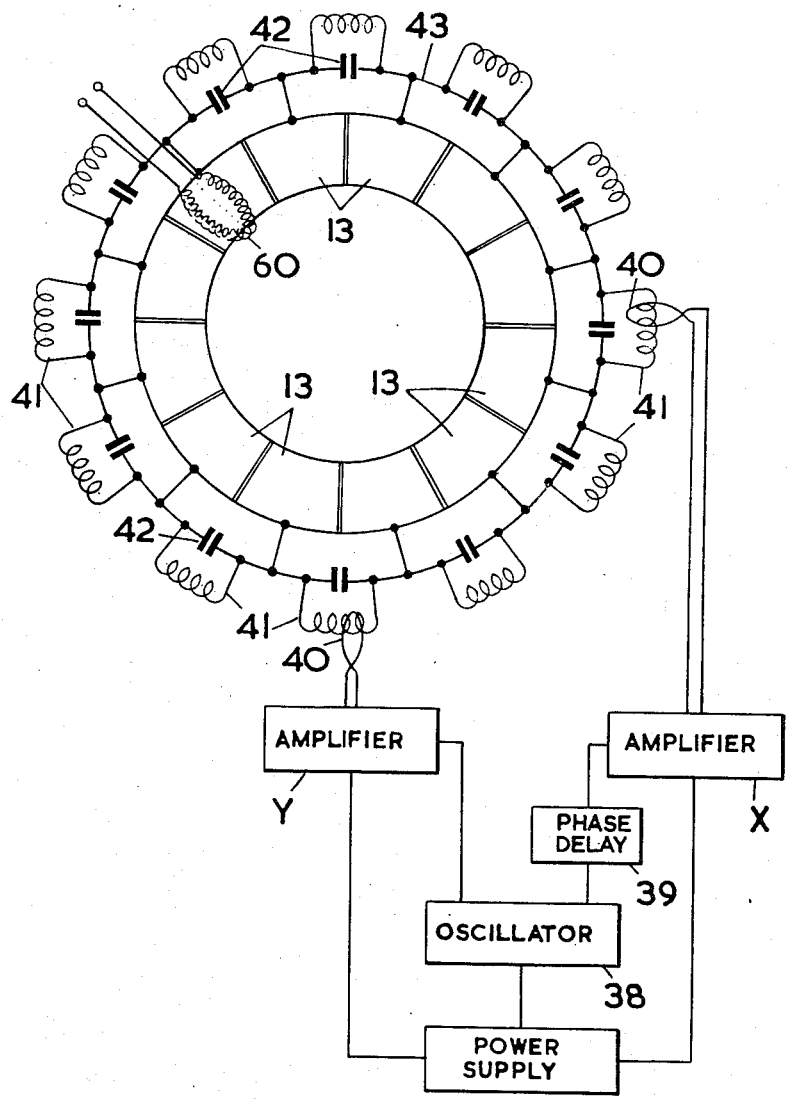
FIG. 9 is a circuit diagram.

The arrangement is such that a travelling wave, similar to that generated in a synchrotron but always in the same rotational direction, is set up in the torus at a velocity dependent on the frequency of the oscillator and the constants of the transmission line. In the present example a velocity of $5 \times 10^8$ cm. per sec. is obtained by employing an oscillator having a frequency of 500 kc./s. and a transmission line designed to resonate at a wave-length equal to the perimeter of the torus. It will be understood that more or less than 12 sectors may be employed and that it can be arranged for the circumference of the torus to contain more than one wave at the same or a different frequency. The inductances 41 and condensers 42 are arranged physically around the device in a manner similar to the circuit diagram (FIG. 9). In FIG. 8 one such inductance 41 and condenser 42 are shown supported by, and electrically connected to, the outlet pipes 18 by means of terminal lugs 44, the remaining eleven being similarly supported and connected. Allowing for the stray capacity of this physical arrangement the required value of each inductance is found to be 100 $\mu$h. and of each condenser 0.001 $\mu$f. The power required is about 600 kw.

Figure 10:
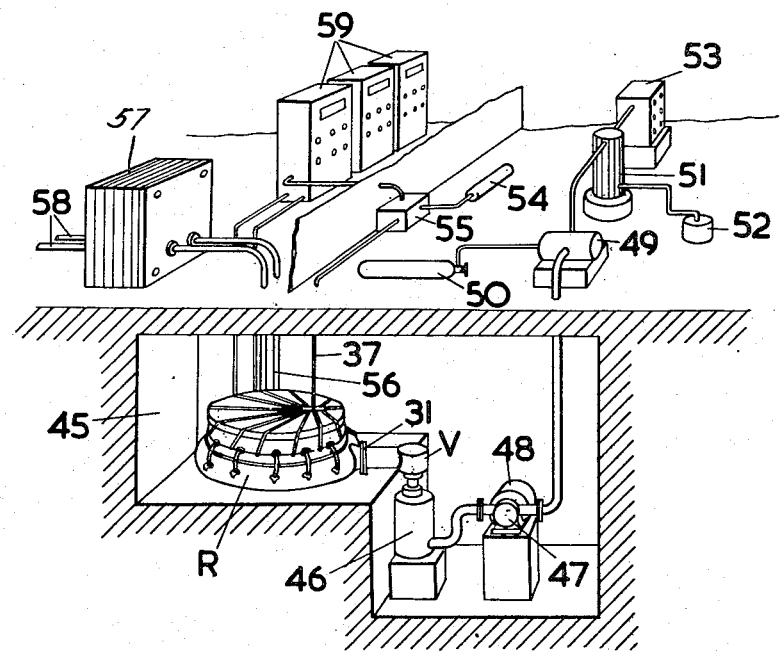
FIG. 10 is a perspective view of the device and accessory plant.

The general layout of the device and its associated accessories is shown in FIG. 10 wherein the device assembly R is housed in a pit 45. The outlet 31 (see also FIG. 8) of the ring exhaust main 30 of the device is connected through a remote control valve V to the inlet of a multi-stage oil diffusion pump 46 which is exhausted by a high vacuum centrifugal pump 47 driven by an electric motor 48.

The outlet of the pump 47 is taken up through the roof of the pit to a recovery plant comprising a combustion vessel 49 to which an oxygen feed is available from cylinder 50. The products of the combustion of the mixture of ordinary hydrogen, deuterium, tritium and helium (the last of two isotopic species) are steam and unchanged helium and these products are fed to a condenser 51 from which the consensate (heavy water) is tapped-off into a vessel 52 and the remaining gaseous fraction (helium) passed to a vessel 53 furnished with tubes containing charcoal and cooled by liquid air or hydrogen.

Deuterium is supplied to the inlet pipe 37 of the reactor from a cylinder 54 through a remotely controlled valve device 55 such as a hot palladium tube the flow through which is controlled by varying the current through a heater associated with the tube.

Flow and return pipes 56 provide cooling fluid for the jacket 2 and are connected to a heat exchanger 57 from which useful heat may be drawn through pipes 58. Circulation of the cooling fluid is ensured by means of a pump (not shown).

The oscillator 38 (FIG. 9), phase delay circuit 39 and amplifiers X and Y are housed in racks 59 as are other control and monitoring instruments of conventional design and not therefore specifically shown in the drawings. These may comprise control gear for the D.C. current supply to the magnet 10, electronic relay means operated by said current for initially controlling the output of the amplifier X and Y, magnetometer relay means sensitive to the ring current in the torus for controlling the exhaust valve V and the inlet valve device and for taking over control of the output of the amplifiers from said relay means. An oscillograph for indicating the build-up of the transient current in the torus is also provided in the racks 59. This consists of a cathode ray tube to which is applied an E.M.F. induced in a pick-up loop 60 encircling a cross section of the torus. Ionisation chambers for monitoring the neutron flux may be arranged around the outer periphery of the torus and connected to meters in the racks 59.

Operation

The operation of starting the device is as follows. A charge of deuterium gas is admitted to give a pressure of about .01 mm. in the torus, the outlet to the pumps 46, 47 is closed by the valve V and the magnet 10 is energised. The current to the magnet 10 is then broken, which produces a discharge in the gas in the manner of a betatron and a strong circulating or ring current is set up in the torus. While this current is at or near its maximum the amplifiers X and Y are automatically switched on at full power, the switch being operated by the aforesaid electronic relay from the current in the magnet. When the current in the torus is established at or near the desired value, the valve V is opened by the magnetometer relay means. This must be adjusted not to take place too soon and particularly not before the gas is completely ionised, or the charge of gas will be very quickly removed since it is only the electric field, due ultimately to the current, which holds most of the gas away from the walls. After the concentration of the ionised gas near the circular axis has occurred the pumps remove the superfluous gas.

When the device is running stably a small inflow of gas is established under the control of valve 55 to replace that decomposed and pumped away. When the current in the torus is well established, the power delivered by the amplifiers X and Y is reduced to its normal running value under the control of the magnetometer relay which also regulates the gas inlet valve 55 to a steady value.

Adjustment of the input flow of gas constitutes a main control for the reactor and automatic means may be provided for reducing this input flow to a low value or to zero when any operating conditions within the reactor, such as the outlet temperature of the coolant fluid, reaches a value outside a predetermined range.

In order to determine the best conditions for starting, the build-up of the transient gas current in the torus is studied by means of the aforesaid oscillograph.

Under these operating conditions, an ionised gas consisting of deuterium at a low density is maintained at what is effectively a very high temperature in the toroidal reaction vessel 1. The loss of heat by conduction to the walls is minimised by the action of the magnetic field set up by the electronic currents circulating round the toroidal vessel. These currents are produced in the first instance by the action of the magnetic field of the betatron and maintained by the potentials applied to the sector electrodes. The energy from the travelling wave serves also to heat the gas in the first instance, but ultimately the collisions in the gas become so violent that nuclear disintegrations occur. The primary reactions in question are $$H_1^2 + H_1^2 \rightarrow He_2^3 + n_0^1$$

$$H_1^2 + H_1^2 \rightarrow H_1^3 + H_1^1$$

They occur with roughly equal probability.

These produce neutrons which escape from the toroid which thus becomes a powerful neutron source. Other products of disintegration supply heat to the walls of the toroid and to the gas. The toroid thus becomes also a powerful source of heat which requires cooling, in the manner described above, if continuous operation at a high energy input is desired. It is however, necessary to continue the supply of energy to the sector electrodes in order to maintain the currents.

When the device is working there is a current flowing round the toroid of about 750,000 amps. The magnetic force due to this current holds the electron orbits in relation to the centre of the circular cross section of the toroid and sets up a radial electric field in the cross section. This field holds the positive nuclei back from collision with the walls and reduces the loss of heat energy to these walls to an amount which can be supplied by the energy of disintegration. The potential difference between the centre of the cross section and the walls depends on the density at which the gas in the toroid is maintained, but is about a million volts.

As the gas enters the toroid it is ionised and ionised molecules are rapidly sucked in to the centre of the section by the above mentioned electric field so that no external injection pump is needed. The ionised molecules supply each one electron and two deuterium nuclei. The electrons replace those which are gradually forced to the walls by the electric field as a result of collisions which momentarily destroy their forward velocity and so the attraction on them of the magnetic field which normally holds them in place. The deuterium nuclei replace those which undergo disintegration. Many of the nuclei produced by disintegrations are shot to the walls and drawn off through the exit ports which as in the example are arranged to cover a large fraction of the wall surface of the toroid. Others are ejected later as a result of collisions together with some unchanged deuterium nuclei. The gas constituted by these nuclei is pumped away by the pumps 46 and 47 and the unchanged deuterium and the tritium produced in the reaction is recovered by an electrolytic process from the heavy water collected in the vessel 52.

As each ionised molecule is sucked in it comes under the action of the magnetic field which deflects it forward. Because of the positive charge on each nucleus this forward motion tends to neutralise the magnetic effect of the electrons moving in the same direction. The electrons thus have to move faster than in a purely electronic flow in order to give the current of 750,000 amps. referred to above. The speed at which the electrons are driven round the toroid in the example described is $5 \times 10^8$ cm./sec. but this is super-posed on a larger random speed of about $1.5 \times 10^{10}$ cm./sec. The component of the speed of the deuterium nuclei round the toroid is about $4 \times 10^8$ cm./sec. and the total speed about 20% greater corresponding to about ¼ mev. energy.

When the device is working steadily there is a state of dynamic equilibrium affecting each component of the gas and a balance is maintained between the input and output of each by means of the automatic control system. Thus for electrons, the input from the ionised molecules balances the loss due to drift, which is calculable. The input of deuterium nuclei balances the loss by disintegration and also those which make their way to the walls and then are pumped away. The products of dissociation in many cases reach the walls at once and then will usually be removed, but the He³ produced in one of the reactions is mostly retained in the first instance owing to its double positive charge and relatively low energy. A certain proportion of the protons and tritium will also be retained being unable to escape the combined electric and magnetic fields. All the tritium retained undergoes a further disintegration with the deuterium yielding neutrons. Such as is pumped away is released by electrolysis from the heavy water collected in vessel 52 and may be used to enrich the inflowing deuterium. Those products which are retained at first are ultimately driven to the walls by collisions and pumped away.

The gaseous fraction which is fed from the condenser 51 and trapped in the refrigerated charcoal tubes in the vessel 53 comprises the two isotopic varieties of helium. The light isotope is of scientific value and is separated from the heavier isotope by fractionation.

There is also an energy balance. The feed nuclei are sucked in by the potential difference and thus derive energy from the electric field. This energy is replaced partly from the travelling electro-magnetic wave and partly from the energy of disintegration, which by removing positively charged disintegration nuclei from the central regions of the toroid maintains the negative charge there.

The electrons derive most of their energy from collisions with the deuterons, though their forward velocity is supplied by the travelling electromagnetic wave. They lose energy by radiation. This radiation increases slowly with the electron energy (in fact as the square root of the energy) while the energy gained by collision with the deutrons is greater the slower the electrons. There is thus an equilibrium point when the two balance corresponding to a velocity of about $1.5 \times 10^{10}$ cm./sec. This varies as the fourth root of the potential difference in the toroid.

Heat is removed from the toroid by the cooling fluid in the jacket 2 enveloping the toroidal vessel, this cooling fluid being passed through the various pockets of the jacket thus providing a reasonably uniform temperature of the cooled surface. If the fluid is water it will become enriched in deuterium as a result of irradiation by neutrons and is therefore kept in the closed primary circulating system (pipes 56) of the heat exchanger.

As noted above, the device may be operated as a source of neutrons. The neutrons produced can be used to produce fission, to make artificially radioactive substances or to turn uranium into plutonium or thorium into U-233. Such substances would be arranged on a suitable platform encircling the torus (outside the jacket) so as to be exposed to the neutron flux therefrom.

The following figures and relationships are given to indicate orders of magnitude and are quoted merely by way of example.

In the specific structure described, having a ring-shaped cavity with a radius of circular cross-section of 30 cms., a circular axis of radius 130 cms. and a volume of about 2,500 litres, the following theoretically determined magnitudes arise, assuming a space charge voltage of 1,000,000 volts and an electron density of $3 \times 10^{14}$ per cc.

| | |
|---|---|
| Total current | 750,000 amps. |
| Excess stream velocity of electrons | $7 \times 10^7$ cm./sec. |
| Mean total velocity of electrons | $1.5 \times 10^{10}$ cm./sec. |
| Deuteron temp. (in volts) | 75 kv. |
| Deuteron temp. (in degrees) | $9 \times 10^8$ deg. C. |
| Mean time before disintegration | 100 secs. |
| Mean life time of electron in torus | 200 secs. |
| Total energy yield | 13,000 kilowatts. |
| Energy input | 600 kilowatts. |
| Energy leaving torus as neutrons | 4,900 kilowatts. |
| Energy leaving torus as heat | 8,100 kilowatts. |
| Neutron output | $4 \times 10^{18}$ per sec. |

(This is approximately that given by 250 million tons of radium beryllium mixture.)

| | |
|---|---|
| Consumption of deuterium | 3.6 grams per day. |
| Power output of oscillators | 600 kw. |

We claim:
1. Apparatus for raising gaseous isotopes of hydrogen to a high temperature and inducing neutron producing reactions therein comprising a vessel enclosing a toroidal cavity and constructed of a plurality of insulated segments serving as electrodes disposed along the length of said cavity, means for introducing gaseous hydrogen isotopes into said cavity, means for applying a collapsing betatron type magnetic field within said cavity effective to accelerate electrons and ionize said isotopes to provide an accumulation of heated hydrogen isotope ions along the axis of said cavity, and means for applying periodically progressing accelerating potentials to said electrodes effective to accelerate said electrons which by interaction accelerate said ions to provide a high temperature hydrogen isotope ionic gas in which said neutron producing reactions are induced.

2. Apparatus as defined in claim 1 wherein said means for applying periodically progressing accelerating potentials includes a segmented delay transmission line coupled successively to said electrode segments and excited by an alternating current power supply.

3. Apparatus as defined in claim 1 wherein said means for applying periodically progressing accelerating potentials includes a closed circuit segmented transmission line coupled successively to said electrode segments and excited at 90° separated points from a two-phase high-frequency alternating current supply.

4. Apparatus for raising a light element gas to a high temperature and inducing neutron producing nuclear reactions therein comprising a vessel defining a continuous toroidal path therein, means for introducing a light element gas into said vessel, means providing a variable magnetic field along the path in said vessel effective to accelerate electrons to interact with said gas to provide an accumulation of heated ions along said path, and means for providing periodically progressing accelerating potentials to cylindrical electrodes disposed coaxially along said path to provide additional acceleration to said electrons and thence by interaction to accelerate said ions to provide a high temperature light element ionic gas in which said neutron producing reactions are induced.

References Cited in the file of this patent

UNITED STATES PATENTS

| | | |
|---|---|---|
| 2,299,792 | Bowers | Oct. 27, 1942 |
| 2,473,477 | Smith | June 14, 1949 |

FOREIGN PATENTS

| | | |
|---|---|---|
| 637,866 | Great Britain | May 31, 1950 |
| 656,398 | Great Britain | Aug. 22, 1951 |

OTHER REFERENCES

Physical Society of London, Proceedings, vol. 64B (1951), February 1951, S. W. Cousins and A. A. Ware, pp. 159–166.

Physical Review, 59 (1941), pp. 997–1004 (an article by Smith).

Fundamentals of Atomic Physics, Saul Dushman, McGraw-Hill Book Co., N.Y. (1951), pp. 261–264.

Nuclear Science and Engineering, The Journal of the American Nuclear Society, vol. 1, No. 4, August 1956, Edward Teller, pp. 313, 320–323.

Chemical and Engineering News, Oct. 10, 1955, pp. 4290, 9292.

Nucleonics, February 1956, pp. 42–44.

Encyclopedia of Atomic Energy, by Frank Gaynor. Philosophical Library, Inc., N.Y., p. 129.